(12) United States Patent
Lavelle et al.

(10) Patent No.: US 6,222,649 B1
(45) Date of Patent: *Apr. 24, 2001

(54) COMPRESSION BY CHROMINANCE SUBSAMPLING IN COLOR IMAGE ACQUISITION

(75) Inventors: Mark T. Lavelle, San Mateo; Bradley N. Suggs, Fremont, both of CA (US)

(73) Assignee: Silitek Corporation, Taipei (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/652,856

(22) Filed: May 23, 1996

(51) Int. Cl.$^7$ ..................................................... H04N 1/46
(52) U.S. Cl. ............................................. 358/505; 358/513
(58) Field of Search .................................... 358/505, 525, 358/530, 509, 513, 515, 520, 523; 348/631, 663

(56) References Cited

U.S. PATENT DOCUMENTS

| | | | |
|---|---|---|---|
| 3,716,286 | * | 2/1973 | St John et al. ........................ 350/3.5 |
| 4,658,289 | * | 4/1987 | Nagano et al. ......................... 358/75 |
| 4,992,860 | * | 2/1991 | Hamaguchi ............................ 358/75 |
| 5,550,653 | * | 8/1996 | Te Winkle ............................ 358/514 |
| 5,729,361 | * | 3/1998 | Suggs ................................... 358/505 |

* cited by examiner

*Primary Examiner*—Jerome Grant, II
(74) *Attorney, Agent, or Firm*—Townsend and Townsend and Crew LLP

(57) ABSTRACT

A method and apparatus for compressing a color image by reducing the amount of color information initially acquired. The color information can later be restored by interpolation from other portions of the image where the color information is available. This not only reduces the amount of data that needs to be stored, but improves the scanning time for an image scanner by reducing the amount of time needed to scan the image. In a preferred embodiment, both the scanning time and the amount of data can be cut in half.

8 Claims, 2 Drawing Sheets

COMPRESSION BY CHROMINANCE SUBSAMPLING IN COLOR IMAGE ACQUISITION

BACKGROUND OF THE INVENTION

The present invention relates to color image sensor devices such as image scanners, facsimile machines and copy machines, and in particular relates to compression techniques in conjunction with such image acquisition devices.

Many different types of devices exist for sensing color images. These can be desktop or hand held scanners, copy machines, facsimile machines, or other devices. A number of different methods are used. In one, a fluorescent lamp is used to illuminate the image, with different color filters being positioned to intercept either the transmitted or reflected light before it is sensed. Alternately, multiple fluorescent lamps with their own dedicated filters used for emitting different colors of light could be used. In yet other devices, instead of fluorescent lamps, light-emitting diodes (LEDs) are used, with different LEDs having different color emissions. For example, a typical configuration might have three types of LEDs, one in the blue range of wavelengths, another in the green range of wavelengths, and another in the red range of wavelengths.

One problem with existing scanning techniques is the large amount of data that needs to be acquired and stored or transmitted to a computer. Typically, each pixel in the image must be digitized three (or more) times, for each of the desired color components (RGB). This consumes a significant amount of time for scanning the image, and also requires a large amount of data be stored or transmitted. In a typical embodiment, each line of the image is read first with red light, then with green, then with blue, and then the scanner moves on to the next line. Existing compression methods require additional time to reduce the amount of data actually stored or transmitted.

SUMMARY OF THE INVENTION

The present invention provides a method and apparatus for compressing a color image by reducing the amount of color information initially acquired. The color information can later be restored by interpolation from other portions of the image where the color information is available. This not only reduces the amount of data that needs to be stored, but improves the scanning time for an image scanner by reducing the amount of time needed to scan the image. In a preferred embodiment, both the scanning time and the amount of data can be cut in half.

In one embodiment, a color scanner has red, green and blue LEDs which are alternately activated in a normal mode to illuminate each line of an image. In the present invention, not all three colors are illuminated for each line. In one embodiment, only luminance information is obtained by activating all three LEDs simultaneously for most lines, and then periodically sampling (such as every fourth line) the individual R, G and B components.

Alternately, the red can be activated for one line, the green for a subsequent line, and the blue for another subsequent line. The green and blue color information for the first line can later be interpolated from the second and third line values. Other combinations of luminance only, full color, and individual colors can be used to generate the time and data bandwidth savings of the present invention.

The present invention recognizes that the human eye is more sensitive to the luminance component at a higher resolution than the chrominance component of an image. Accordingly, less chrominance information than luminance information can be acquired without noticeable impact on image quality.

For a fuller understanding of the nature and advantages of the invention, reference should be made to the ensuing detailed description taken in conjunction with the company drawings.

DETAILED DESCRIPTION OF THE PREFERRED EMBODIMENTS

The present invention can be used with any number of types of image acquisition hardware. One example of an image scanner implementing the present invention is set forth in FIGS. 1–3.

Figure 1:
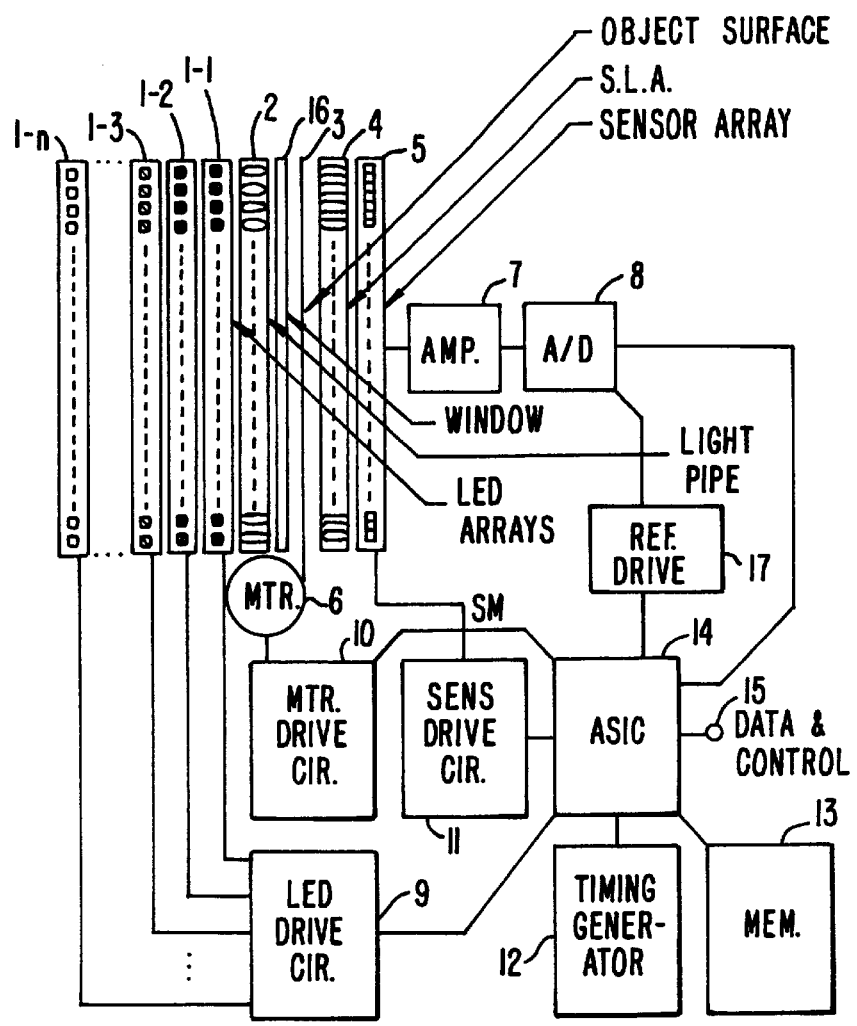
FIG. 1 is a block diagram of the electronics of one scanner using the present invention.
Figure 2A:
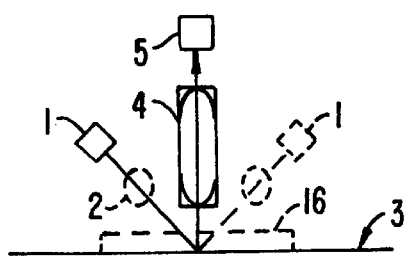
FIGS. 2A and 2B illustrate several possible arrangements of the optical elements of the scanner of FIG. 1.
Figure 2B:
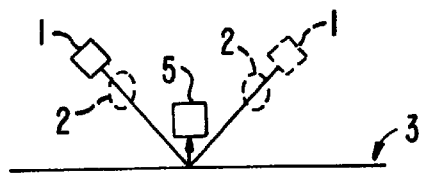

FIG. 1 is a system diagram of one embodiment of the invention. A plurality of LED arrays (1-1 to 1-n in FIG. 1) emit light of different spectra and are driven by a LED drive circuit 9. A surface presenting a visible object 3, for example, a manuscript, a drawing, a figure, a photograph, and the like (hereinafter referred to as the object surface), is illuminated with the light emitted from the LED arrays in a substantially linear manner. The light emitted from the LED arrays may be redirected, and/or concentrated, and/or homogenized by an optional optical element 2 (hereinafter referred to as the light pipe) before irradiating the object surface through an optional transparent window 16. Light reflected from this object surface enters a linear array of photosensitive elements 5 after passing through the transparent window again (if present), and either after passing through a self-focusing lens array 4 (hereinafter referred to as the S.L.A.), as in the case of a normal contact-type image sensor, as shown in FIG. 2A; or without passing through a S.L.A., as in the case of a complete contact-type image sensor, as shown in FIG. 2B. The LED arrays may be situated on either one side or both sides of the sensor array as indicated in FIG. 2.

The timing generator 12 provides the basic clock frequency ($f_o$) to the ASIC 14 for use in synchronizing all operations for the device. The LED drive circuit 9 provides the appropriate power levels to the LED arrays (1-1 to 1-n) in response to the timing signals (SL-1 to SL-n) from the ASIC 14. For each line of the document, each of LED arrays 1-1 through 1-n are activated in sequence before moving on to the next line. An entire array of a particular color will be activated at one time to produce a line of light rather than being individually activated. Although shown in a linear array in FIG. 1, alternate embodiments may be preferable as discussed below with respect to FIG. 3.

The motor drive circuit 10 produces the energizing signal required by the motor 6 to accomplish sub-scanning of the manuscript 3 in response to the motor drive signal (SM) from the ASIC 14. For the motor, a rotary stepper type could be employed most advantageously, though a linear stepper type or other type capable of discrete motion may also be utilized. The motor either moves the scanner across the paper, or the paper across the scanner. It is moved one step or line at a time, with each of the LED arrays being activated before the next move.

The sensor drive circuit 11 converts the timing signals (SI and CLK) from the ASIC 14 into the impulses necessary for the sensor array 5 to accomplish the main scanning operation. In particular, this clocks the data out of the photosensors and, if a shift register output is used, shifts the data out to amplifier 7. The amplifier 7 applies a consistent bias voltage (optionally zero) and a consistent gain factor (optionally unity or even non-linear) to the output voltages (SO) from the sensor array so as to bring them within the range of the analog-to-digital (A/D) converter 8. The output of the A/D converter 8 is provided to ASIC 14, where it may be stored in memory or provided over an output port of the scanner. Memory 13 stores correction factors for the photosensor, and in one embodiment, these are applied through a reference drive 17 to set the low (offset) and high (offset plus range) voltage reference values of a A/D converter 8 for each particular photosensor pixel for each color.

The ASIC 14 of FIG. 1 is synchronized by the timing generator 12 to access the memory 13 and provide signals to all of the driving circuitry (9, 10, 11, and 17) in addition to communication of control and data signals on a port 15 to a host computer for any of the purposes of further image processing, display, printing, modem transfer, or facsimile transmission. The ASIC may additionally be tasked to perform such operations as controlling the device in a manner to obtain gray scale or binary image representations and/or providing alternative output data representations (e.g., data formatting and/or data compression/encoding and/or color space conversion).

As shown in FIG. 2A, the LED array is arranged at a 45° angle to the photosensor array 5. The LEDs can be on one side or on both sides, with the arrangement on both sides doubling the intensity of light, at the cost of adding additional components. A 45° angle is used rather than a direct reflective 90° angle in order to provide a more diffuse reflection, which is especially important when reading glossy paper. As shown in FIG. 2B, the SLA of 4 of FIG. 2A can be eliminated in one embodiment.

Figure 3:
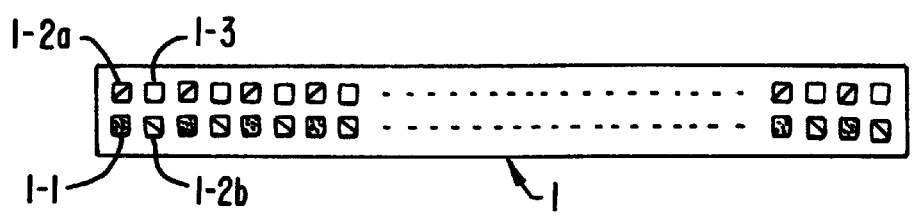
FIG. 3 is a diagram of an embodiment of an LED layout for the scanner of FIG. 1.

FIG. 3 shows an example of the arrangement and composition of the LED arrays. This example demonstrates that co-linearity is not essential, nor is the number of LED types in an array limited to one. However, in the simplest case, as few as three types would be arranged linearly so that the arrays would be interlaced in an approximately evenly and closely spaced repeating pattern. This would allow the arrays to be located in close proximity to the object surface so that the object surface could be sufficiently and more uniformly illuminated from each array either without using a light pipe 2, or by using a light pipe of decreased cost and complexity.

As shown in FIG. 3, four different colors could be interleaved, colors indicated by 1-1, 1-2a, 1-2b, and 1-3. Alternately, one of the locations, such as 1-2b, could be left unused, such as where the LEDs come in a three per package die, arranged in an L-shape where the common connection completes the square. In yet another embodiment, the reduced luminous flux of the blue LEDs could be addressed by doubling the amount of blue LEDs compared to the other LEDs. Thus, for instance, the 1-2a and 1-2b LED positions in FIG. 3 could both be blue LEDs.

According to a preferred embodiment of the present invention, ASIC 14 controls the activation of the LEDs to limit the chrominance information acquired, thereby speeding up the scan time and limiting the amount of data acquired. In the example of FIG. 1, a luminance only line is achieved by activating all of the different color LEDs at the same time, to produce a white light source. The acquisition of this luminance only information requires only one third of the time as activating the three different colors sequentially. In alternate embodiments, a white light source, such as a fluorescent lamp, might be used, and filters normally interposed could be eliminated, or a detector selected which is not in front of a filter for luminance information. Other possible image acquisition embodiments would be obvious to those of skill in the imaging art.

For purposes of this description, acquiring a line of image data involves illuminating the line, activating the detector for an appropriate integration time, and converting the analog detector output to digital data for storing in a buffer, such as memory 13 of FIG. 1, or transmitting to a remote computer.

In addition, the scanner can acquire a full-color line by acquiring the same line of the source image three times, each time illuminating the source with a different color group. The combination of the data from the three acquisitions gives a complete description of the line in both the luminance and chrominance components.

The chrominance subsampling is achieved by acquiring in full-color only every fourth line, while acquiring luminance-only for all other lines. Scanning proceeds as follows:
full-color line
luminance-only line
luminance-only line
luminance-only line
full-color line
luminance-only line
luminance-only line
luminance-only line
full-color line
etc.

The consumer of this image data then "uncompresses" the data by interpolating the chrominance component of the luminance-only lines from the chrominance data from the full-color lines.

The ratio of full-color lines to luminance-only lines may be varied. For example, better final image quality can be obtained by acquiring a full-color line every other line or every third line (with the accompanying increase in time and data size), or a reduction in scan time and data size (and image quality) can be obtained by acquiring full-color lines less frequently than every fourth line.

Another alternative would be to introduce single-color lines, where the scanner acquires each source line twice, once with white illumination and once with single group illumination. Assuming the groups were called R, G and B, scanning could proceed as follows:
single-color R line
single-color G line
single-color B line
single-color R line
single-color G line
single-color B line
single-color R line
etc.
or:
single-color R line single-color G line
single-color B line
single-color G line
single-color R line
single-color G lines
single-color B line
single-color G line
etc.

These alternatives with single-color lines suffer the disadvantages of not having any completely defined (in terms of both luminance and chrominance) image locations as references, which would make aliasing a problem. Some compromise alternatives could be:

full-color line
luminance-only line
single-color R line
luminance-only line
single-color G line
luminance-only line
single-color B line
luminance-only line
full-color line
etc.

or:

full-color line
luminance-only line
single-color G. line
luminance-only line
luminance-only line
full-color line
etc.

Figure 4:
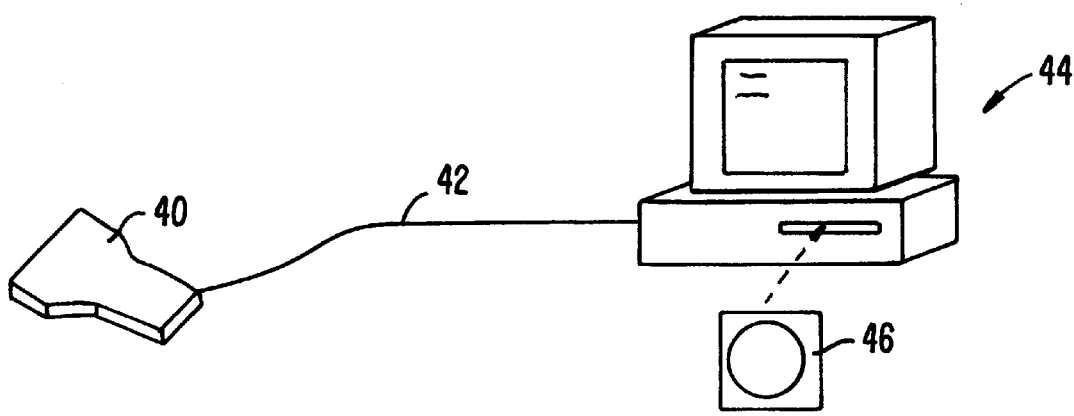
FIG. 4 is a diagram of a scanner connected to a computer incorporating the present invention.

FIG. 4 illustrates one image acquisition system to which the present invention may be applied. A hand-held color scanner 40 acquires the image, and stores and/or transmits it over a line 42 to a computer 44. The image can be manipulated by computer 44 using a program stored on a floppy disk memory 46 which can be sold with the scanner 40. Alternately, other systems are possible, such as a desktop scanner, copier, etc. The present invention allows not only an increase the speed with which an image may be scanned by scanner 40, but also limits the amount of data that needs to be transmitted over line 42 to computer 44.

Figure 5:
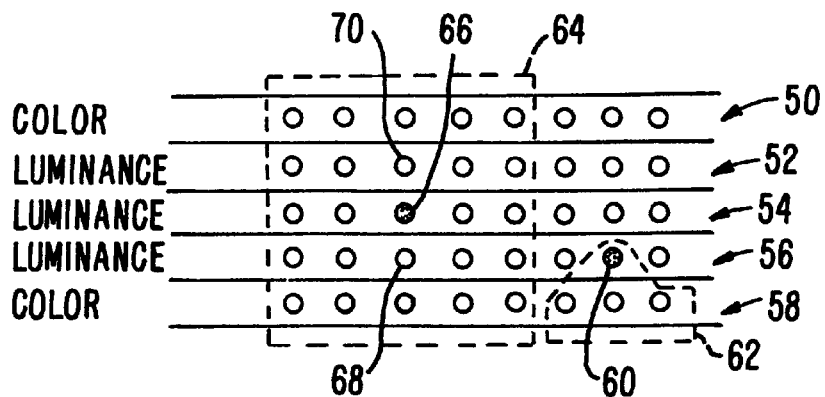
FIG. 5 is a diagram illustrating the pixel interpolation according to one embodiment of the invention.

A program stored on floppy disk 46 and executed by computer 44 can decompress the image data sent to it by scanner 40. FIG. 5 shows an example of five image lines in one embodiment where color information is acquired for a first line 50, while luminance-only information is acquired for subsequent lines 52, 54 and 56. Full-color information is again acquired for a line 58. The color information for lines 52, 54 and 56 is then restored in a decompression technique. First, lines 52 and 56 are addressed, since they are close to lines having color information. Looking at an example of pixel 60, its color is determined based on the color of the three closest full-color pixels illustrated by dotted line 62. Any number of weightings could be used, with the closest pixel having the highest weighting.

Subsequently, the pixels in line 54 can be determined. Preferably, this is based on the values of the pixels within a block 64 of 5×5 pixels. The weighting of the color values of the pixels can be varied depending upon their closeness to the pixel 66 whose color value is being restored. For example, the interpolated color value of adjacent pixels 68 and 70 can be given twice the weighting of pixels in lines 50 and 58. Any number of interpolation schemes could be used.

In the embodiments where only a single color is acquired for some of the lines, the missing colors can be interpolated from the nearest adjacent pixels of the missing color. If R, G and B are alternately illuminated, this would ensure that the color information missing is no more than two lines away from any given pixel.

As will be understood by those of skill in the art, the present invention may be embodied in other specific forms without departing from the spirit or essential characteristics thereof. For example, instead of the color information comprised of R, G and B, other color values could be used, such as Y, U, V format or C, Y, M format. Alternately, the invention may be applied to a gray scale. Accordingly, the above description is intended to be illustrative, but not limiting, of the scope of the invention which is set forth in the following claims.

What is claimed is:

1. A method for scanning an image, comprising:
   directing light to said image;
   detecting first reflected light from said image, said first reflected light having only luminance information for a plurality of first portions of said image;
   detecting second reflected light from said image, said second reflected light having at least partial chrominance information for a plurality of second portions of said image:
   generating first and second electrical detection signals corresponding to said first and second reflected light, in an alternating pattern in a sub-scanning direction
   generating data signals from said detection signals, said data signals including only luminance information for said first portions of said image;
   transmitting said data signals;
   receiving said data signals; and
   decompressing said data signals by reconstructing full chrominance information for said image.

2. The method of claim 1 wherein only a single color light signal is detect a plurality of said lines.

3. The method of claim 1 further comprising:
   directing one of three colors at each line of said image, such that one of every three lines has the same color light directed at it; and
   directing a luminance signal at each line of said image.

4. The method of claim 1 wherein said generating comprises converting said electrical detection signal into digital signals in a scanner, and said reconstructing step is performed in a computer receiving said digital signals from said scanner.

5. The method of claim 1 wherein said reconstructing comprises interpolating a missing color value for a pixel from a present color value from at least a closest adjacent pixel.

6. The method of claim 1 further comprising:
   directing a single color light at a first plurality of said lines; and
   directing a full color light at a second plurality of said lines.

7. The method of claim 6 wherein said directing a full color light comprises sequentially directing each of three colors of light at said second plurality of lines.

8. A method for scanning an image, comprising:
   directing light to said image wherein said directing directs less than full chrominance light for a portion of said image;
   detecting reflected light from said image and generating an electrical detection signal;

generating a data signal from said detection signal, said data signal including less than full chrominance information for a portion of said image;

reconstructing full chrominance information for said image;

directing a full luminance light signal at each line of said image;

directing a partial chrominance signal at a portion of the lines of said image; and directing a full color light signal at every fourth line for said image, and a luminance only signal at each intervening three lines.

* * * * *